Sept. 27, 1932.  S. TREY  1,879,594
AEROPLANE WING
Original Filed July 25, 1928  2 Sheets-Sheet 2
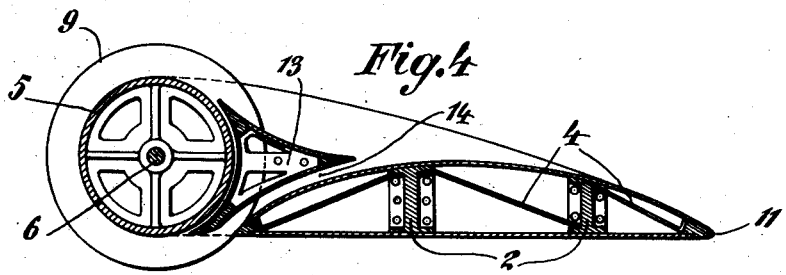
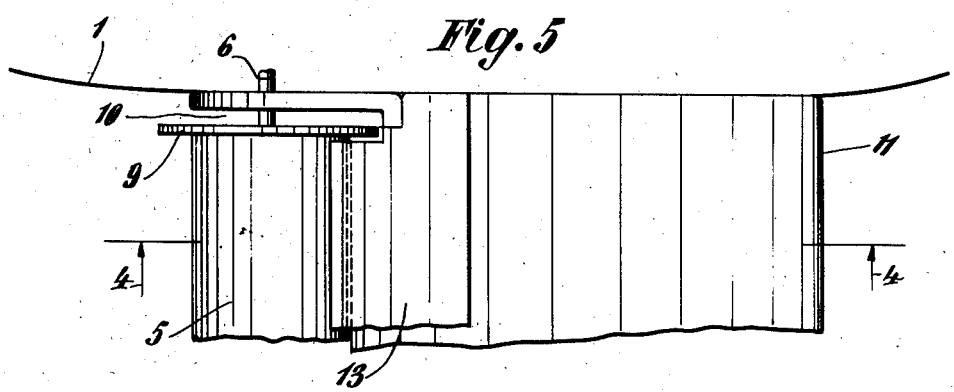
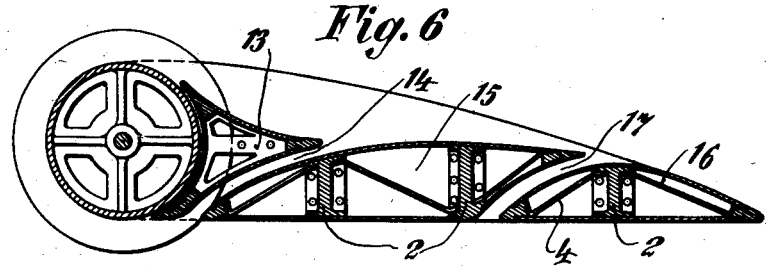
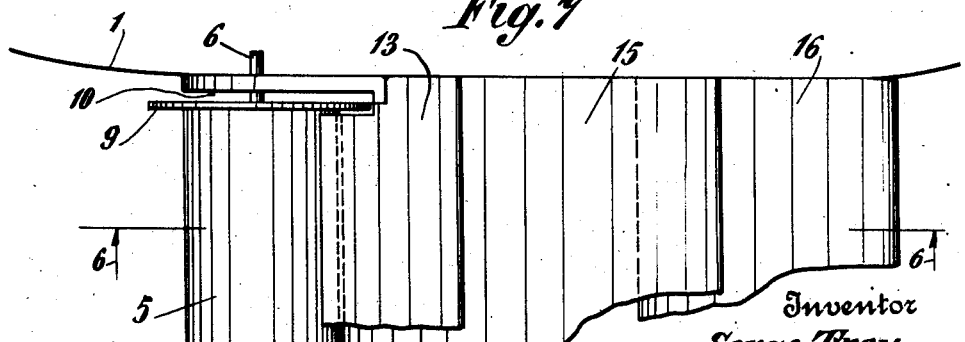
Inventor
Serge Trey,
By his Attorney Patented Sept. 27, 1932

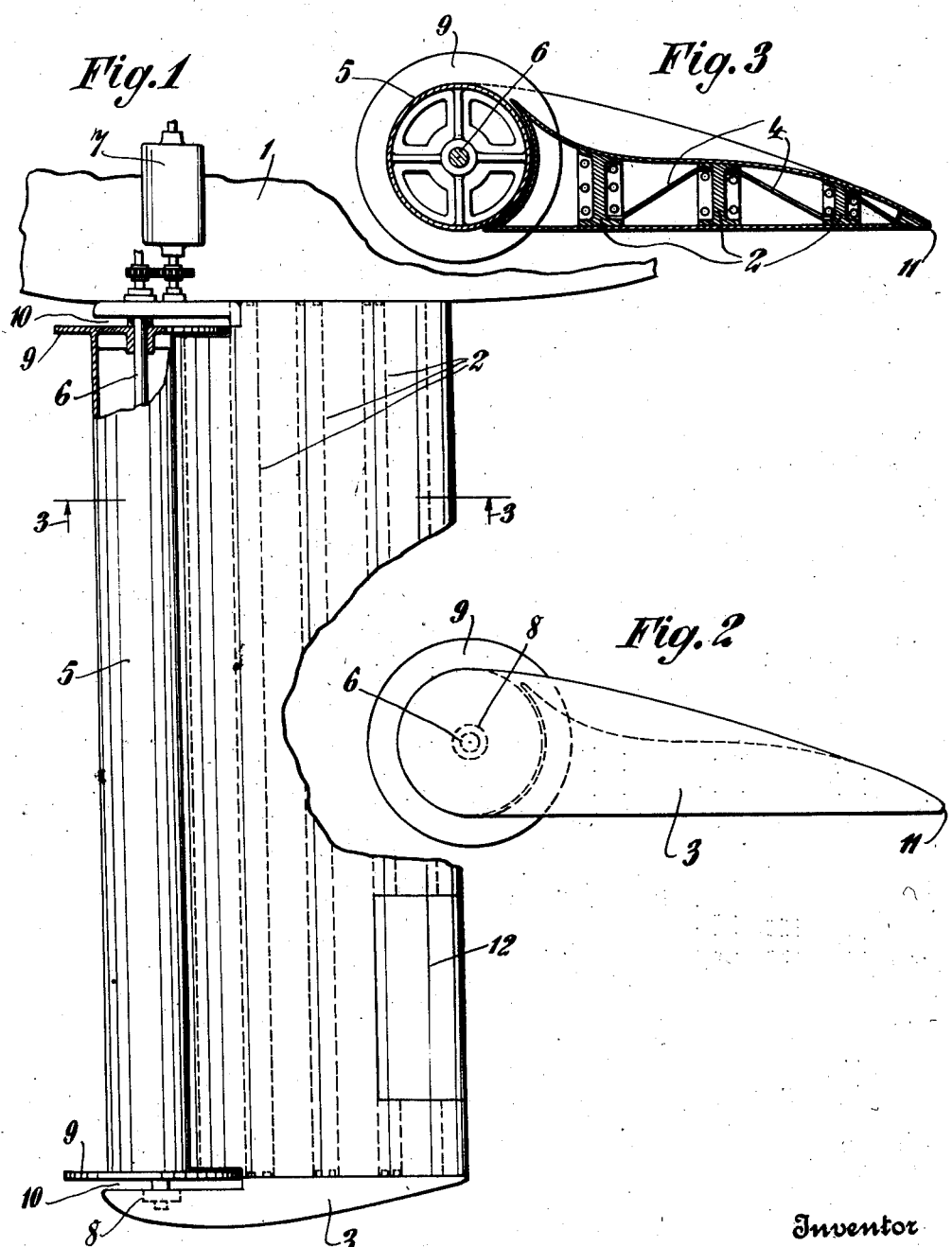

1,879,594

UNITED STATES PATENT OFFICE

SERGE TREY, OF COLLEGE POINT, NEW YORK

AEROPLANE WING

Application filed July 25, 1928, Serial No. 295,274. Renewed December 7, 1931.

My invention relates to aerofoils in general and, more particularly, to aeroplane wings or fan blades in which rotating cylinders or other forms of rotors are incorporated in the wing or blade structure.

The application of the principle known as the "Magnus effect" to wing structures has been repeatedly attempted after the possibility of using rotating cylinders was demonstrated in connection with marine vessels, but such attempts have not heretofore been of practical value. While the lift coefficient of a wing with a rotating cylinder at its leading edge was raised to a high degree in such experimental work, the drag coefficient became so great that a very low efficiency resulted. The failure of these attempts in the past may be ascribed to the fact that the standard wing profile was retained throughout, such, for instance, as the Goettingen profile No. 386. I have discovered, after a long series of tests conducted in a wind tunnel in New York, that the aerodynamic problem involved demands a radical departure from the standard wing profile. Instead of being convex throughout (having reference to the upper surface of the wing), the profile must have a concave portion adjacent to and immediately behind the rotating cylinder, followed by a convex portion which ends at the trailing edge of the wing. With such a profile, the lift coefficient is even higher than in the case of standard profiles with rotating cylinders, while the drag coefficient is very substantially reduced. I have also discovered that the drag coefficient is further reduced, and the efficiency of the wing greatly enhanced by adding a slot immediately behind the rotating cylinder, this slot being curved in a sense opposite to that of the concave portion of the upper surface of the wing. A still further improvement in the efficiency of the wing is obtained by adding a second slot, of substantially the same shape as the first, near the trailing edge of the wing. The wing structure, as a whole, may be considered as of tandem design, the first element being the rotating cylinder, followed by a biconcave, fairing immediately behind the rotor and one or more aerofoils, tandem fashion, so spaced as to provide the above mentioned slots in the wing.

The actual shape of the profile, naturally, may vary within the limits dictated by good practice, and within rather wide limits the above noted high lift coefficient and low drag coefficient have been obtained by me in the tunnel tests referred to in the preceding paragraph in every case and with a great variety of profiles, but every one of them was characterized by the general property which I have found to be necessary in order to secure such coefficients, namely, that the upper surface of the wing portion adjacent the rotor be concave, contrary to the usual shape of standard wings. As to the lower wing surface, that may or may not have a camber. The best results were obtained with the two slotted wing. As high as three times the normal lift coefficient may be secured with a wing structure embodying my invention, while retaining an excellent lift to drag ratio. I have found this to be as high as twenty to one, and more for some of the profiles. The critical angle of incidence, also, is raised to one greatly beyond the critical angle of standard wings, being over 40°. What these results mean when applied to an aeroplane must be obvious to all familiar with the art and it is not necessary to point out the advantages afforded by the present invention.

In the drawings, Figure 1 is a plan view of an aeroplane wing embodying my invention; Figure 2 is an end view of the same wing; Figure 3 is a cross section taken along the line 3—3 of Figure 1; Figures 4 and 5 are, respectively, a cross section and fragmentary plan view of a modified form of the present invention; and Figures 6 and 7, respectively, a similar cross section and partial plan view of an aeroplane wing of modified construction embodying my invention.

Referring to the figures in detail, 1 is a supporting body for the aeroplane wing, which may be the fuselage of the aeroplane. The wing construction, however, is not limited to aeroplane wings. It may be applied to the blade of a fan or of a propeller, for instance, the fan of a helicopter, such as is disclosed in my copending application, Serial No. 149,034, in which case the supporting body 1 would be the structure of the vertical shaft to which the blades of the fan are attached. To the body 1 is attached a wing frame comprising the longitudinal beams 2 and the transverse end member 3, the beams 2 being attached at one end to the body 1, and at the other end to the member 3. The wing frame may be reinforced in any suitable manner, as by means of cross members 4. A hollow cylinder 5 is journalled at one end in the supporting body 1, its shaft 6 being geared to a motor 7, and, at the other end, in the member 3, as at 8, in a manner such as not to expose the journal. The motor 7 is carried by the supporting body 1. The cylinder 5 is closed at both ends by circular plates 9 projecting beyond the cylindrical surface of the rotor. The plates 9 are fixed to the cylinder 5 and revolve with it. These plates are, preferably, spaced from the supporting body 1 and from the end member 3, as shown at 10. The end member 3 is, of course, stream lined. The wing proper is built around the frame and is attached to the beams 2. It is shaped to conform to the surface of the cylinder 5 which constitutes its leading edge and is as close to it as possible without causing friction between the adjacent surfaces of the cylinder and of the wing proper. The upper surface of the wing portion adjacent the rotor is concave. The concave surface gradually passes into a convex surface ending at the trailing edge 11 of the wing. The under surface of the wing is shown as flat, but it may have a camber. The shape of the under surface does not materially affect the operation of the device. The wing may be provided with the usual aileron 12.

The preferred forms are shown in Figures 4 to 7. In these modifications of the device, the wing is provided with a single slot (Figures 4 and 5), or with two slots (Figures 6 and 7). The general shape of the wing profile is, however, the same as in the case illustrated in Figures 1 to 3, i. e. the upper surface of the wing portion adjacent the rotor is concave, the concave surface gradually passing into a convex surface ending at the trailing edge.

The slots are obtained in the following manner. A biconcave wing section, or fairing, 13, is mounted on the framework of the wing and is attached, at one end, to the supporting body 1, and, at the other end, to the member 3. The rest of the wing proper is attached to the frame in the same manner as in the case illustrated in Figures 1 to 3, except that it is spaced from the fairing 13 to provide for the slot 14, in Figures 4 and 5, and is made up of two sections or aerofoils 15 and 16, in Figures 6 and 7, separated by the slot 17. The wing may be said to be of tandem construction.

It will be noted that the slots 14 and 17 have similar shape and that their curvature is in a direction opposite to that of the upper surface of the wing portion adjacent the rotor.

The rotor, as illustrated, is cylindrical in shape, but I do not limit myself to this shape. In the case of a tapering wing, for instance, the rotor would be conical in shape, and, in fact, it may be given any suitable shape in accordance with the particular wing profile adopted.

The form of wing illustrated in Figures 1 to 3 has been shown mainly to bring out the general characteristics which a wing profile must have when a rotor is incorporated at its leading edge, namely, the concave upper surface in the wing portion adjacent the rotor, but to secure a really efficient wing in such a combination it is necessary to provide the slot 14. The flow through this slot co-operates with the flow produced by the rotation of the cylinder in preventing detachment of the air stream from the upper surface of the wing, with the result that formation of vortices is effectively eliminated. In this cooperation, the shape of the slot 14 and its position relatively to the rotor play an important part. The second slot, 17, further improves the aerodynamic properties of the wing, but its omission may be well justified by considerations of structural simplicity.

I claim:

1. The combination with a wing, of a rotor at the leading edge thereof, the portion of said wing adjacent said rotor having a concave upper surface and being provided with a slot having a curvature in opposite sense to that of said concave wing portion.

2. The combination with a wing, of a rotor at the leading edge thereof, the portion of said wing adjacent said rotor being provided with a slot presenting a convex surface with respect thereto.

3. The combination with a wing, of a rotor at the leading edge thereof, said wing being provided with two slots, one, in the wing portion adjacent said rotor, presenting a convex surface with respect thereto, and a second slot, near the trailing edge, of substantially the same shape as the first mentioned slot.

4. A wing comprising a rotor at its leading edge, a biconcave fairing adjacent said rotor, and one or more upwardly convex aerofoils adjacent said fairing, tandem fashion.

5. The combination with a wing frame attached to a supporting body, of a rotor journalled in said supporting body and in said frame at the tip end thereof, a biconcave fairing mounted on said frame adjacent said rotor and conforming to the shape thereof, and one or more upwardly convex aerofoils mounted on said frame adjacent said fairing, tandem fashion.

6. The combination with a wing attached to a supporting body, of an end member at the tip of said wing, a rotor journalled in said supporting body and in said end member at the leading edge of said wing, and circular plates at the ends of said rotor, the portion of said wing adjacent said rotor being provided with a slot presenting a convex surface with respect thereto.

7. The combination with a wing attached to a supporting body, of an end member at the tip of said wing, a rotor journalled in said supporting body and in said end member at the leading edge of said wing, and outwardly projecting plates at the ends of said rotor spaced respectively from said supporting body and from said end member, said wing being slotted immediately behind said rotor and provided with a second slot near the trailing edge.

8. The combination with a wing frame attached to a supporting body, of a rotor journalled in said supporting body and in said frame at the tip end thereof, a biconcave fairing mounted on said frame adjacent said rotor and conforming to the shape thereof, and one or more upwardly convex aerofoils mounted on said frame adjacent said fairing, tandem fashion.

9. The combination with a wing frame attached to a supporting body, of a rotor journalled in said supporting body and in said frame at the tip end thereof, outwardly projecting plates at the ends of said rotor spaced respectively from said supporting body and from the tip end of said frame, a biconcave fairing mounted on said frame adjacent said rotor and conforming to the shape thereof, and one or more upwardly convex aerofoils mounted on said frame adjacent said fairing, tandem fashion, and spaced to provide one or more slots in said wing, respectively.

10. A wing comprising a rotor at its leading edge, a biconcave fairing adjacent said rotor and conforming to the shape thereof, and one or more upwardly convex aerofoils adjacent said fairing, tandem fashion, and spaced to provide one or more slots in said wing, respectively.

11. The combination with a wing frame attached to a supporting body, of a rotor journalled in said supporting body and in said frame at the tip end thereof, a biconcave fairing mounted on said frame adjacent said rotor and conforming to the shape thereof, and one or more aerofoils mounted on said frame adjacent said fairing, tandem fashion, spaced to provide, respectively, one or more slots in said wing.

12. The combination with a slotted wing tapering towards its trailing edge, of a rotor at the leading edge thereof, the upper surface of said wing having a concave portion adjacent said rotor.

13. The combination with a slotted wing tapering towards its trailing edge, of a rotor at the leading edge thereof, the upper surface of said wing having a concave portion adjacent said rotor, and the slot or slots of said wing presenting a convex surface with respect to said rotor.

14. The combination with a wing tapering towards its trailing edge, of a rotor at the leading edge thereof, the portion of said wing adjacent said rotor having a concave upper surface and being provided with a slot having a curvature in a sense opposite to that of said concave wing portion.

15. The combination with an aerofoil, of a rotor at the leading edge thereof, the upper surface of said aerofoil sloping towards the trailing edge without reversal of pitch and having a concave portion adjacent said rotor.

16. The combination with an aerofoil tapering towards its trailing edge, of a rotor forming the leading edge thereof, the upper surface of said aerofoil sloping towards said trailing edge without reversal of pitch and having a concave portion adjacent said rotor.

17. The combination with an aerofoil tapering towards its trailing edge, of a rotor forming the leading edge thereof, the upper surface of said aerofoil sloping towards said trailing edge without reversal of pitch and having a concave portion adjacent said rotor followed by a convex portion ending in said trailing edge.

18. The combination with a slotted wing tapering towards its trailing edge, of a rotor at the leading edge thereof, the upper surface of said wing sloping towards said trailing edge without reversal of pitch and having a concave portion adjacent said rotor.

19. The combination with a wing frame attached to a supporting body and tapering towards the trailing edge, of a rotor journaled in said supporting body and in said frame at the tip end thereof, and a wing mounted on said frame adjacent said rotor, the upper surface of said wing sloping towards said trailing edge without reversal of pitch and having a concave portion adjacent said rotor followed by a convex portion ending in said trailing edge.

20. The combination with a wing attached to a supporting body, of an end member at the tip of said wing, a rotor journaled in said supporting body and in said end member at the leading edge of said wing, and a circular plate at each end of said rotor, the upper surface of said wing having, adjacent said rotor, a concave portion followed at its nethermost line by a convex portion ending at the trailing edge.

21. The combination with a wing frame attached to a supporting body, of a rotor journalled in said supporting body and in said frame at the tip end thereof, and a wing mounted on said frame adjacent to and conforming to the shape of said rotor, the upper surface of said wing having, adjacent said rotor, a concave portion followed at its nethermost line by a convex portion ending at the trailing edge.

22. The combination with a wing, of a rotor forming the leading edge thereof, the upper surface of said wing having a concave portion adjacent said rotor, the concavity of said concave portion ending at its nethermost line.

23. The combination with a wing, of a rotor at the leading edge thereof, the upper surface of said wing having, adjacent said rotor, a concave portion followed at its nethermost line by a convex portion ending at the trailing edge.

24. An aerofoil comprising a rotor at its leading edge and bounded on top by a surface of double curvature, the tangent plane at the line of said double curvature being parallel to the plane drawn from the trailing edge of said aerofoil tangent to said rotor.

25. An aerofoil tapering towards its trailing edge and comprising a rotating cylinder at its leading edge, said aerofoil having an upper surface of double curvature, the tangent plane at the line of said double curvature being parallel to the plane drawn from said trailing edge tangent to said cylinder.

SERGE TREY.